May 23, 1961    G. A. SIMA    2,985,457
TOOL HOLDER
Filed June 10, 1959

INVENTOR.
GEORGE A. SIMA
BY
*J. William Freeman*
ATTORNEY 2,985,457
Patented May 23, 1961

2,985,457
TOOL HOLDER

George A. Sima, Macedonia, Ohio, assignor, by decree of distribution, of one-half to Howard Cramer and one-half to Florence B. Sima Filed June 10, 1959, Ser. No. 819,359

4 Claims. (Cl. 279—93)

This invention relates to the art of tool holders and in particular relates to improvements in quick change tool holders wherein the tools can be changed with a minimal amount of delay and effort.

In the known prior art, there have been previous attempts to provide quick change tool holders with the usual arrangement being to provide a holder, a collet and a cap that secures the collet in the holder during use.

While the above types of prior art devices have been satisfactory, the same have necessarily been rather expensive to produce since they require at least three component elements in each case and further require special machining so that the component parts can be quickly disengaged.

It has been discovered that a simplified type of tool holder having quick change features can be provided by merely providing the gripping collet with means for coacting with the tool holder that is received in the machine spindle and in this fashion, upon insertion of the collet followed by a quarter turn in either direction, the collet will be firmly locked in place for subsequent use.

It accordingly becomes the principal object of this invention to provide an improved type of tool holder that features two component parts that are quickly and easily engageable together so as to support a tool around an axis of rotation.

Other objects of the invention will become more apparent upon a reading of the following brief specification, considered and interpreted in the light of the accompanying drawings.

Figure 1:
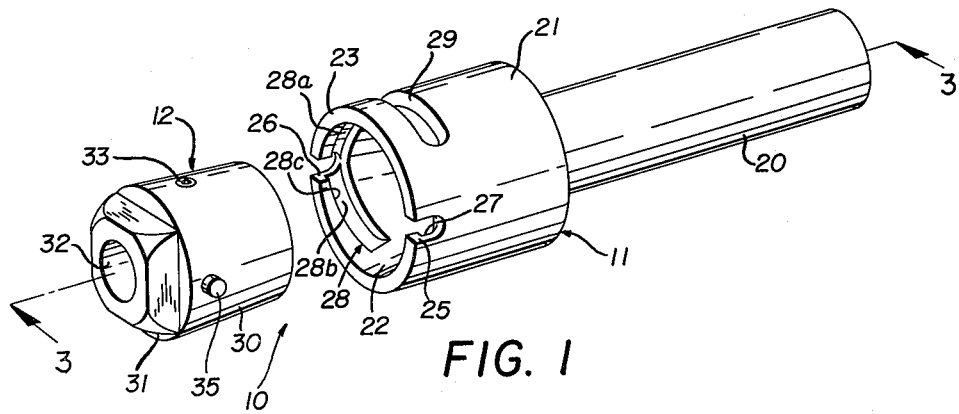
Figure 1 is an exploded perspective view of the improved tool holder.

Referring now to the drawings and in particular to Figure 1 thereof, the improved quick change adapter, generally designated by the numeral 10, is shown being defined by a holder unit 11 and a tool gripping collet 12 that is contoured for telescopic reception in the holder 11 so that a tool may be received in the collet 12 and supported about the axis of rotation of the holder 11.

Figure 3:
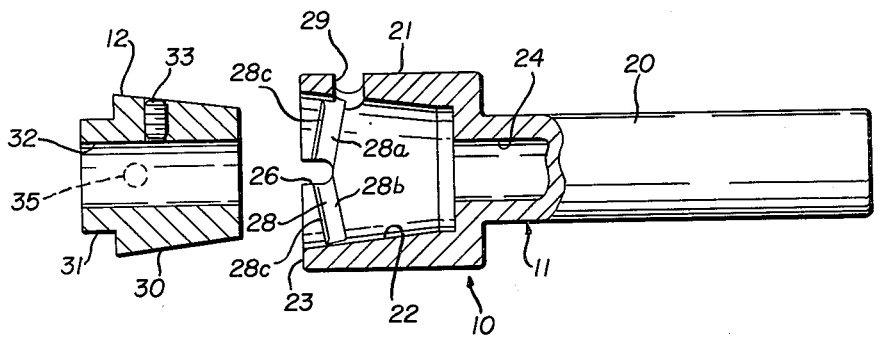
Figure 3 is a sectional view taken on the lines 3—3 of Figure 1.

Considering first the structure of the holder 11, it will be seen from Figure 1 that the same includes a cylindrical shank 20 that terminates in an enlarged cylindrical head portion 21, with head 21 having a tapered socket 22 extending inwardly from end 23 thereof and with shank portion 20 being internally bored as at 24 for communication with the socket 22 as is clearly shown in Figure 3 of the drawings. In this fashion, a draw bolt can, if desired, be positioned within the bore 24 to draw the collet into the tapered socket 22 although it is to be understood that this arrangement will be used only infrequently in extreme cases.

For the purpose of providing quick release and engagement with the tool holding collet 12, the wall section of head 21 is shown provided with a pair of diametrically opposed slots 25 and 26 that extend axially inwardly from end 23 a relatively short distance so as to communicate with opposed guide slots 28, 28 that are provided on the wall of socket 22, with one guide slot 28 being clearly shown in Figures 1 and 3 of the drawings and with it being understood that the opposed guide slot 28 is of similar configuration, as will now be described.

Referring to Figure 3 for a detailed description of the slot 28, it will be seen that the same includes segments 28a and 28b, each of which terminate at one end adjacent the slot 26 so that the collet 12 may be locked by rotating the same in either direction. In this regard, it will be noted that the slot 28 extends through circumferential course while progressing axially inwardly from slot 26. In effect, this creates a spiral slot or groove on the wall of socket 32.

In this way, when either guide pin 35, 35 of collet 12 is received in either slot 27 or 28, the same may be moved either through the slot portion 28a or 28b and by virtue of the fact that both of these slots progress axially inward during rotation, the collet 12 will be advanced axially inwardly to become more firmly seated in the socket 22. It is preferable in each instance that the side wall 28c of each slot 28a and 28b be disposed out of perpendicular to the bottom wall portion thereof so as to effectuate a camming action during the relative rotation that occurs during engagement (see Figure 3).

In addition to the aforementioned component parts, the head 21 also includes a circumferentially extending slot 29 in the wall thereof so as to provide access to the tightening means for the collet holder 12, as will presently be described.

Considering next the detailed structure of the tool holding collet 12, it will first be seen that the same is of generally cylindrical configuration so as to include a tapered external surface 30 that is designed for complemental seating against the tapered socket 22. A reduced shoulder portion 31 is formed to receive a tightening wrench, while a central bore 32 is provided for the purpose of receiving a tool therein such as a drill. A set screw 33 is capable of bearing against a tool received in bore 32 and permits the same to be locked.

In addition, and as previously indicated, the external surface 30 is further provided with a pair of projecting pins 35, 35 that are diametrically opposed to each other and which are intended to be received through the guide slots 25 and 26 for movement in slots 27 and 28.

In use or operation of the improved quick change unit, it is merely necessary that a tool be positioned in the bore 32 of the tool holding collet 12 and fixed therein by tightening of the set screw 33. In this regard, the tool, of course, can project beyond the small diameter end of the collet in view of the fact that the same could be received in the bore 24 of the holder 11.

Figure 2:
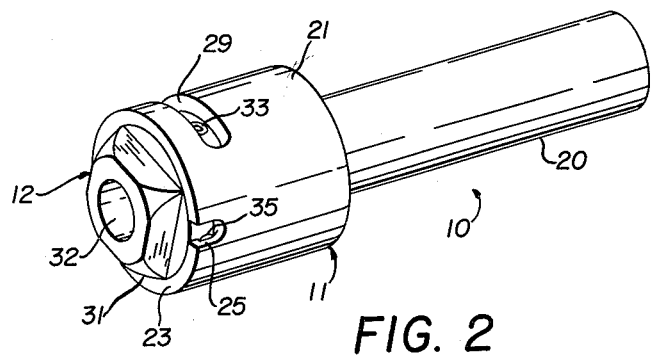
Figure 2 is a view similar to Figure 1 but showing the tool holder in assembled condition.

With a tool thus positioned and fixed against axial movement relatively of collet 12, the collet 12 can be aligned with respect to the end 23 of the holder 11 and in such aligned condition, the pins 35, 35 can be passed into the grooves 25 and 26, whereupon a rotational turn of the collect 12 will cause the pins 35, 35 to move into registry with either grooves 28a, 28a or 28b, 28b, depending on the direction of rotation. After initial rotational turning, as shown in Figure 2, a wrench can be placed on the reduced shoulder portion 31 and the collet 12 drawn further into seating position with the holder 11.

In this regard, the direction of rotation of the holder 12 will always be known so that the selective feature of permitting rotation is either direction will always insure that the rotational movement of the holder will be directed against the tool surface in such a manner as to always cause the pin to be urged further inwardly of the groove in which the same is received. In this fashion, the collet will be continuously retained in seated condition and accidental disengagement is avoided.

When it is desired to change the tool in question, either one of two steps may be followed.

First, if a tool of the same diameter shank is going to be received, the collet 12 will not have to be disturbed from the holder 11 and the tool can be removed by merely passing an appropriate wrench through slot 29 so as to engage with screw 33 and back the same off to permit removal of one tool and insertion of another.

If a different diameter tool is going to be employed, then a different adapter collet 12 will have to be employed with a different diameter bore 32 and in such instances, it is merely necessary that a wrench be placed on the shoulder 31 and the device turned in the appropriate rotational direction to cause unseating of the same with respect to socket 22. When this has been accomplished and the pins 35, 35 are in registry with slots 25 and 26, the tool may be easily removed and another adapter collet 12 reinserted with a minimal amount of lost time.

It will be seen from the foregoing that there has been provided a new and novel type of quick change tool holder that is characterized by a positive type of interconnection between an adapter collet and a tool holder with means being provided thereon for locking the tool against rotation in either of two directions and with additional means being provided for eliminating the need for disengagement when it is merely desired to replace a tool with another tool of the same diameter shank.

It is, of course, to be understood that the preferred material will be hardened tool steel, but applicant's invention is not restricted to any particular type or form of steel composition and similarly, the invention additionally contemplates that, if desired, the pin and slot connection could be reversed and the holder provided with the pins, while the collet was provided with a slotted surface that would coact with the same.

Accordingly, modifications of the invention may be resorted to without departing from the spirit hereof or the scope of the appended claims.

What is claimed is :

1. A quick change tool holder of the character described, comprising; a rotatable body member having a tapering socket extending inwardly from one end thereof; a collet receivable in said socket and having a tapering external surface that is complemental to said socket; locking means carried by said collet and retaining a tool in position in said collet, with said locking means opening into said tapering external surface of said collet; and pin and groove means interconnecting said collet with said body and moving said collet axially of said socket upon relative rotation therebetween, whereby said collet may be seated and unseated with respect to said socket; said locking means being disposed in substantially the same radial plane as said pin; said body member having an access opening in registry with said locking means when said collet is seated, whereby said tool may be positioned with respect to said collet when said collet is seated in said socket.

2. A quick change tool holder of the character described, comprising; a rotatable body member having a tapering socket extending axially inwardly from one end thereof; said socket having at least one circumferentially extending groove provided in the wall thereof, with said groove being accessible from an axially extending access slot; said groove extending circumferentially of said socket in a combined radial and axial direction; said groove having a depth shallower than the wall thickness of said body adjacent the point of juncture with said access slot and further including an elongate portion that opens between the inner and outer walls of said body; a collet receivable in said socket and having a tapered external surface that is complemental to said socket and that terminates adjacent a small diameter end thereof; at least one pin projecting radially of said tapered surface of said collet and being receivable in said access slot and said grooves, whereby said pin seats said collet in said socket upon movement thereof relatively of said groove.

3. A quick change tool holder of the character described, comprising; a rotatable body member having a tapering socket extending axially inwardly from one end thereof; said socket having at least one circumferentially extending groove provided in the wall thereof, with said groove being accessible from an axially extending access slot; said groove extending circumferentially of said socket in a combined radial and axial direction; a collet receivable in said socket and having a tapered external surface that is complemental to said socket and that terminates adjacent a small diameter end thereof; at least one pin projecting radially of said tapered surface of said collet and being receivable in said access slot and said grooves, whereby said pin seats said collet in said socket upon movement thereof relatively of said grooves; each said groove including circumferentially divergent leg portions, whereby said collet may be rotated in opposite directions following passage of said pin through said access slot.

4. A quick change tool holder of the character described, comprising; a rotatable body member having a tapering socket extending inwardly from one end thereof; a collet receivable in said socket and having a tapering external surface that is complemental to said socket; locking means carried by said collet and retaining a tool in position in said collet with said locking means opening into said tapering external surface of said collet; pin and groove means interconnecting said collet with said body; said grooves being defined by an axially extending entry portion that terminates in circumferentially divergent leg portions, whereby said pin may enter through said entry portion and be selectively engaged in either said leg portion, whereby said collet may be seated and unseated with respect to said socket; said body member having an access opening in registry with said locking means when said collet is seated.

References Cited in the file of this patent
UNITED STATES PATENTS

| 748,398 | Middleton | Dec. 29, 1903 |
| 931,327 | Manzel | Aug. 17, 1909 |
| 1,781,442 | Currier | Nov. 11, 1930 |
| 1,808,051 | Maslewski | June 2, 1931 |
| 2,337,402 | Mills | Dec. 21, 1943 |